United States Patent [19]

Janner et al.

[11] 4,138,297
[45] Feb. 6, 1979

[54] METHOD FOR ISOTOPE SEPARATION BY MEANS OF COHERENT ELECTROMAGNETIC RADIATION

[75] Inventors: Karl Janner, Erlangen; Klaus Gregorius, Neunkirchen; Heinz Stehle, Marloffstein, all of Fed. Rep. of Germany

[73] Assignee: Kraftwerk Union Aktiengesellschaft, Mulheim, Fed. Rep. of Germany

[21] Appl. No.: 773,505

[22] Filed: Mar. 2, 1977

[30] Foreign Application Priority Data

May 3, 1976 [DE] Fed. Rep. of Germany ....... 2609205

[51] Int. Cl.$^2$ ............................................. B01J 1/10
[52] U.S. Cl. ..................... 204/157.1 R; 204/DIG. 11
[58] Field of Search ....................................... 204/157.1

[56] References Cited

U.S. PATENT DOCUMENTS 4,020,350  4/1977  Ducas ......................... 204/DIG. 11

FOREIGN PATENT DOCUMENTS 2447762  4/1976  Fed. Rep. of Germany ... 204/DIG. 11

Primary Examiner—Howard S. Williams
Attorney, Agent, or Firm—Herbert L. Lerner

[57] ABSTRACT

Method for isotope separation or enrichment in a vaporous mixture of compounds containing the isotopes to selectively excite the group of molecules containing one isotope by means of coherent, polarized electromagnetic radiation (lasers) in which a frequency shift is prevented or greatly reduced and the excitation state can be driven very high to beyond the dissociation limit. This is accomplished by adjusting the frequency and field strength of the radiation so that the dipole moment of the group of molecules to be excited, oscillates, at least at the final amplitude, mainly in phase opposition to the exciting field, and the other group of molecules mainly in phase with the exciting field. In another procedure the radiation has a frequency closer to the resonance frequency of the group of molecules to be separated and is of the order of magnitude of the isotope-determined frequency difference, and both groups of molecules operate in phase opposition.

25 Claims, 13 Drawing Figures

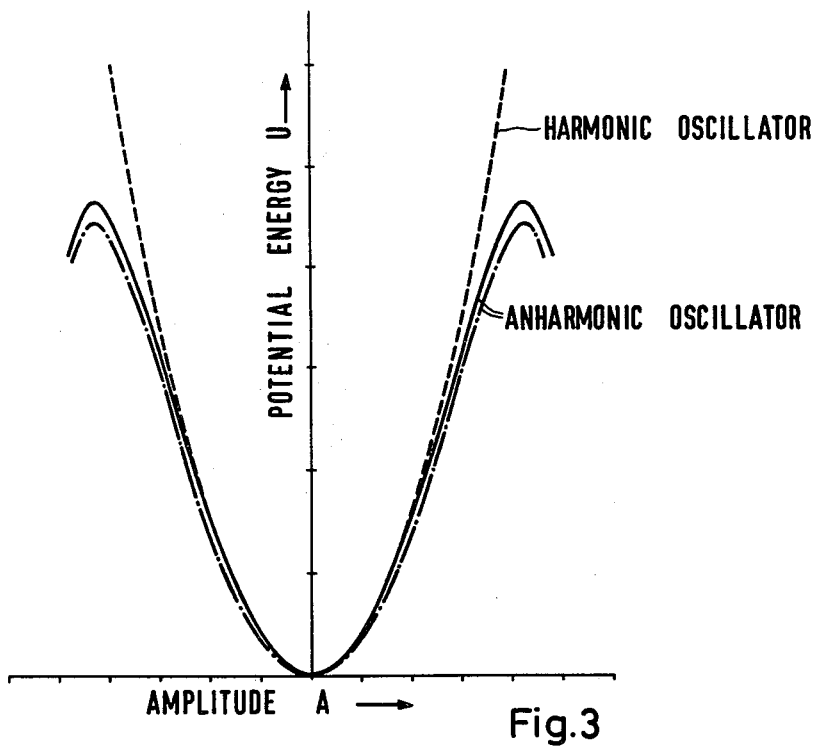
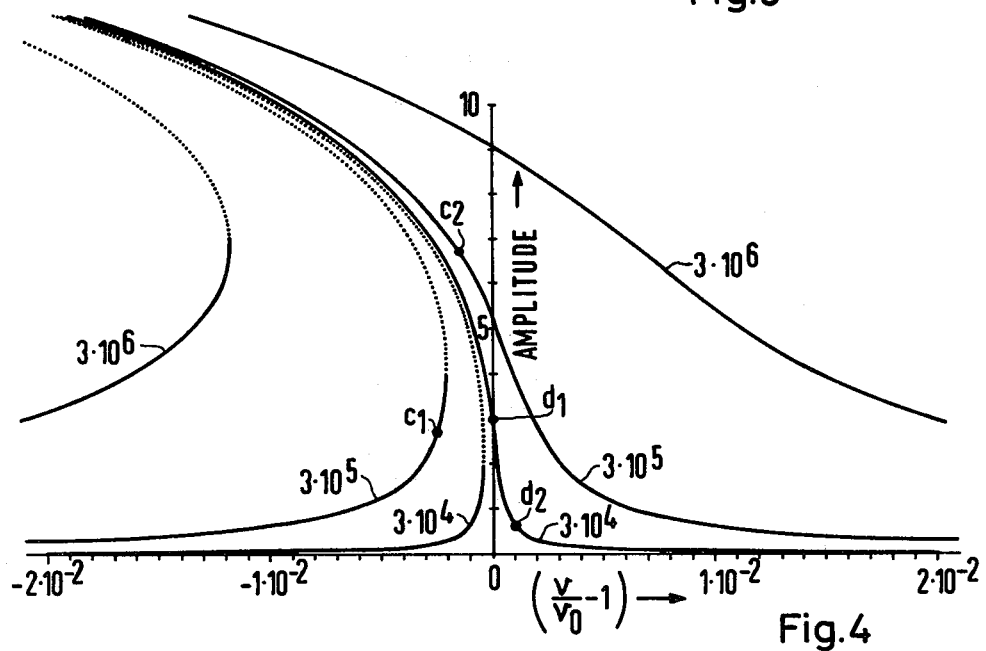

METHOD FOR ISOTOPE SEPARATION BY MEANS OF COHERENT ELECTROMAGNETIC RADIATION

BACKGROUND OF THE INVENTION

Field of the Invention

This invention relates to separation or enrichment of isotopes and more particularly refers to a new and improved method of isotope separation or enrichment in a vaporous mixture of compounds of the isotopes by means of coherent, polarized electromagnetic radiation.

2. Description of the Prior Art

Isotope separation or enrichment in a vaporous mixture of compounds or atoms of the isotopes by means of coherent, polarized electromagnetic radiation are known. Such radiation can be obtained by lasers of varied types. At various times, proposals also have been made to use such high-energy radiation for exciting atoms and molecules, specifically as to nuclides, and to perform thereby the separation of isotopes or an enrichment of the isotopes.

In view of the fuel supply for nuclear power plants, the enrichment of the uranium isotope U 235 is especially of great interest, as the heretofore practiced processes for separation of U 235, such as, for example, gas diffusion, are extremely expensive and require a large amount of technology.

Uranium vapor has alredy been proposed as the starting material for the uranium isotope separation or enrichment. However, the execution of these methods, technically, is very difficult because of the requirement of very high temperatures of more than 2000° C. Of the uranium compounds, $UF_6$ has the highest vapor pressure. For this reason, and because fluorine has no isotopes, it has been proposed to selectively excite and enrich one $UF_6$ isotope compound by means of laser radiation. Reference is made here particularly to the U.S. Pat. Application Ser. No. 579,544, which relates to the utilization of the molecule dipoles induced by the electric field of the radiation. These dipoles, excited specifically as to the isotopes, are suitable not only for separation by physical means, but they also constitute molecules in an excited state, in which they readily are capable of entering into, for example, chemical reactions with reaction partners or reactants that are supplied to them. It has been found, however, that it is relatively difficult to obtain the desired or necessary high excitation energy, as the rotational vibration frequencies of the molecules with higher excitation stages change as a rule toward lower frequencies and the molecules are therefore no longer able to absorb the exciting, constant-frequency radiation to the original extent. This vibration behavior corresponds to that of an anharmonic oscillator.

SUMMARY OF THE INVENTION

An object of the present invention is to provide a method of excitation for the separation or enrichment of isotopes in a vaporous mixture of molecules containing the isotopes by means of coherent polarized electromagnetic radiation, in which a frequency shift of the group of molecules to be excited is prevented or greatly reduced and the excitation state can, in principle, be driven very high to beyond the dissociation limit.

With the foregoing and other objects in view, there is provided in accordance with the invention, in a method for the separation or enrichment of isotopes in a vaporous mixture of compounds or atoms of the isotopes to selectively excite the group of molecules containing one isotope by applying to the vaporous isotope mixture a radiation with a frequency and field strength which are adjusted so that the dipole moment of the molecule group to be excited oscillates, at least at the final amplitude, mainly in phase opposition to the exciting field, but the equivalent group of the other isotope mainly in phase with the exciting field.

Another embodiment in accordance with the invention is the appliction to the vaporous isotope mixture of a radiation with a frequency closer to the resonance frequency of the molecule group to be separated than to the equivalent group of molecules of the other isotope and is in the order of magnitude of the isotope-determined frequency difference, and that both kinds of molecules vibrate in phase opposition to the exciting field.

In a further, supplementary way of conducting the method in accordance with the invention, wherein in addition to applying the coherent radiation to the vaporous isotope mixture with the frequency adjusted such that the molecule or atom dipoles of the isotope to be excited selectively oscillate mainly in phase opposition to the exciting field of the radiation, there is also radiated-in harmonics thereof to the extent that a shift of the resonance frequency of the dipoles is prevented.

BRIEF DESCRIPTION OF THE DRAWINGS

Other features which are considered as characteristic for the invention are set forth in the appended claims.

Although the invention is illustrated and described herein as embodied in a method for isotope separation by means of coherent electromagnetic radiation, it is nevertheless not intended to be limited to the details shown, since various modifications may be made therein without departing from the spirit of the invention and within the scope and range of equivalents of the claims.

Figure 1:
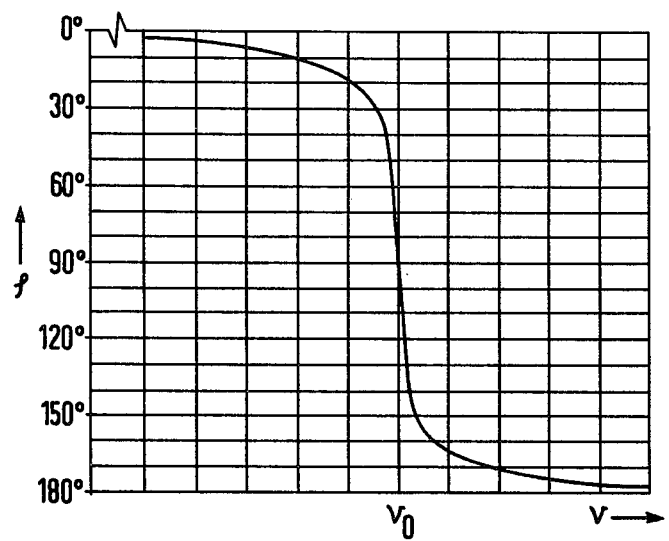
Figure 2:
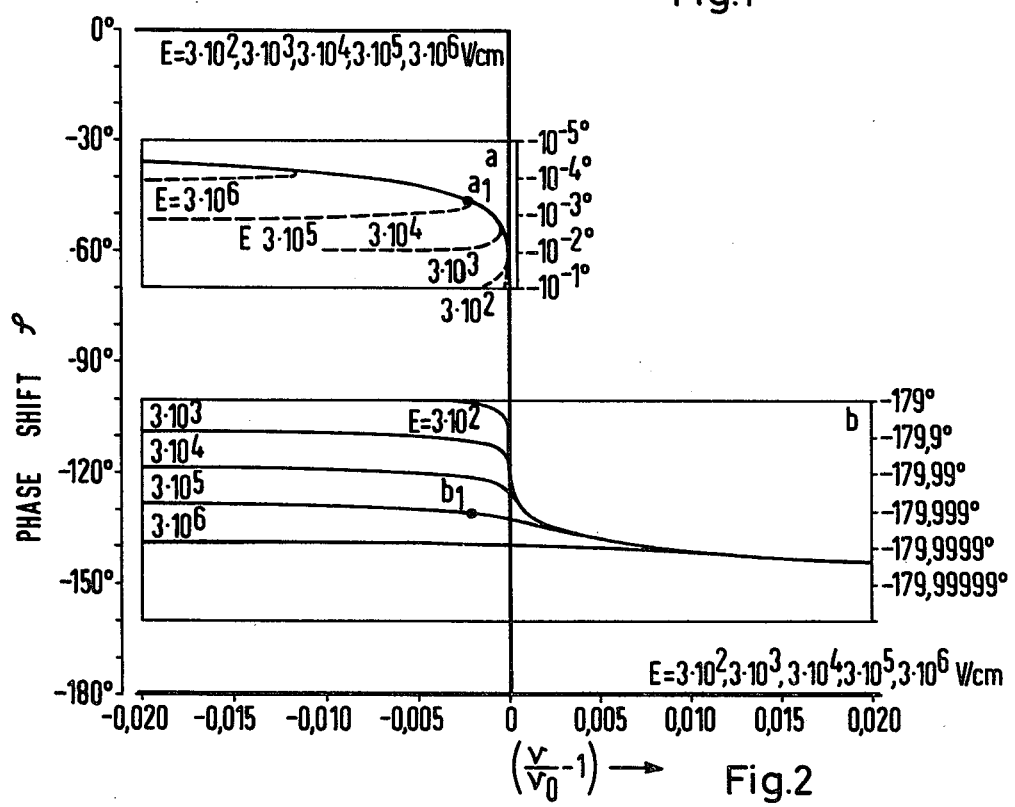
Figure 5:
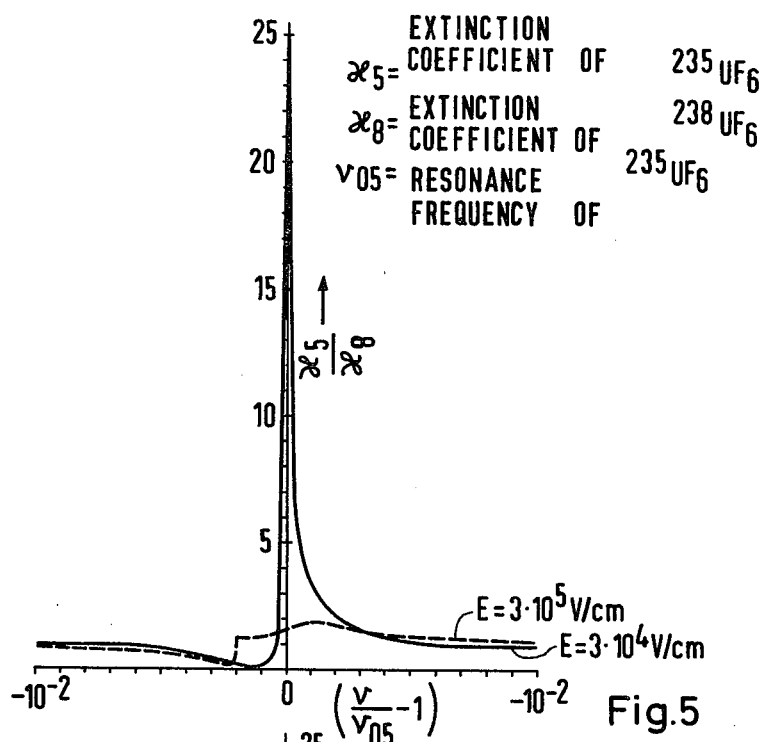
Figure 6:
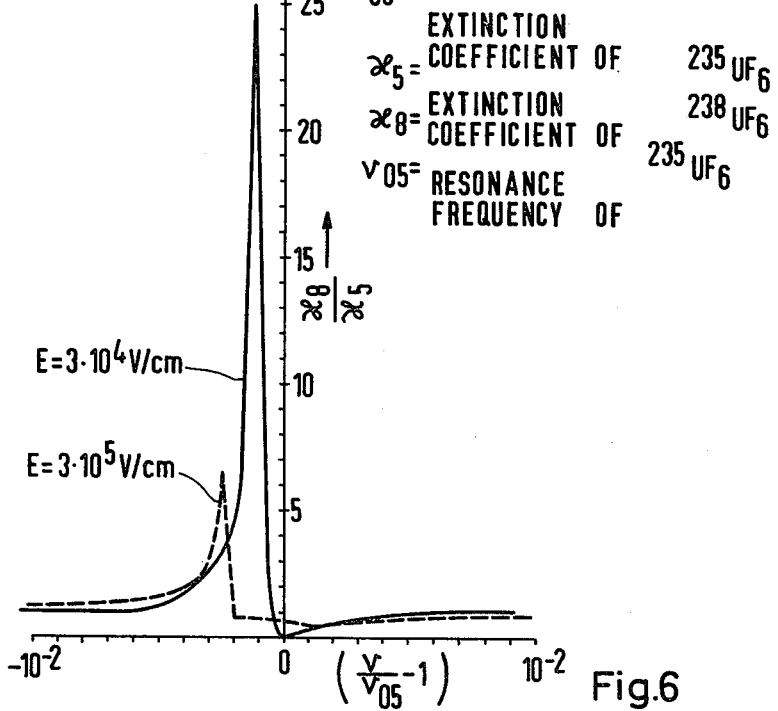
Figure 7:
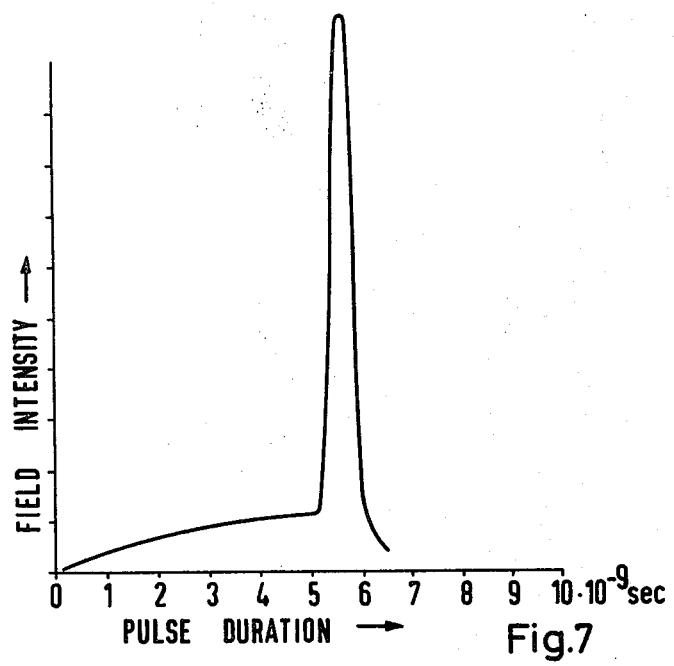
Figure 8:
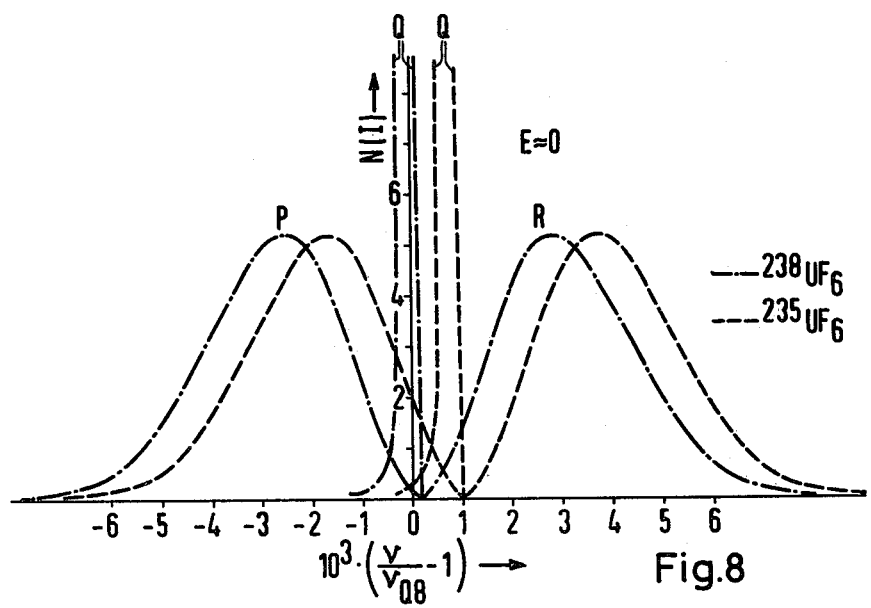
Figure 9:
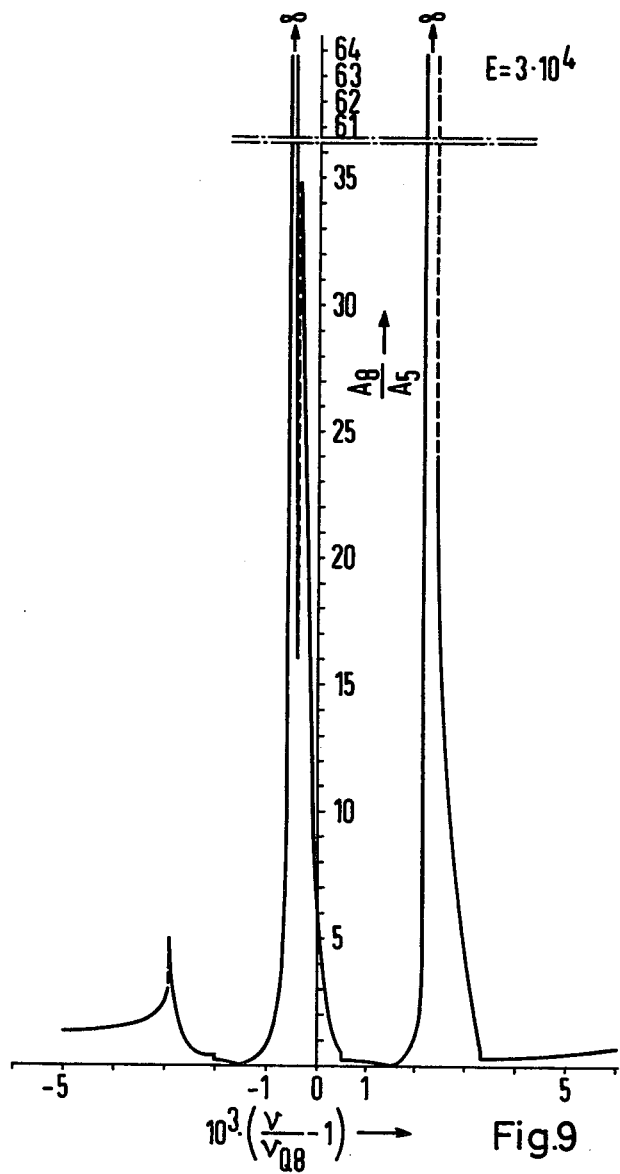
Figure 10:
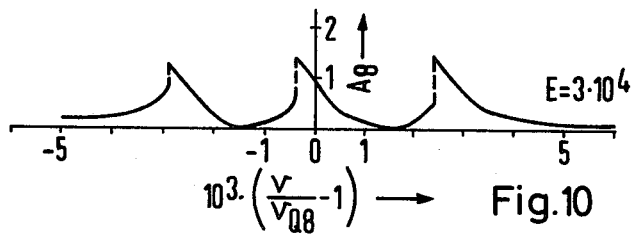
Figure 11:
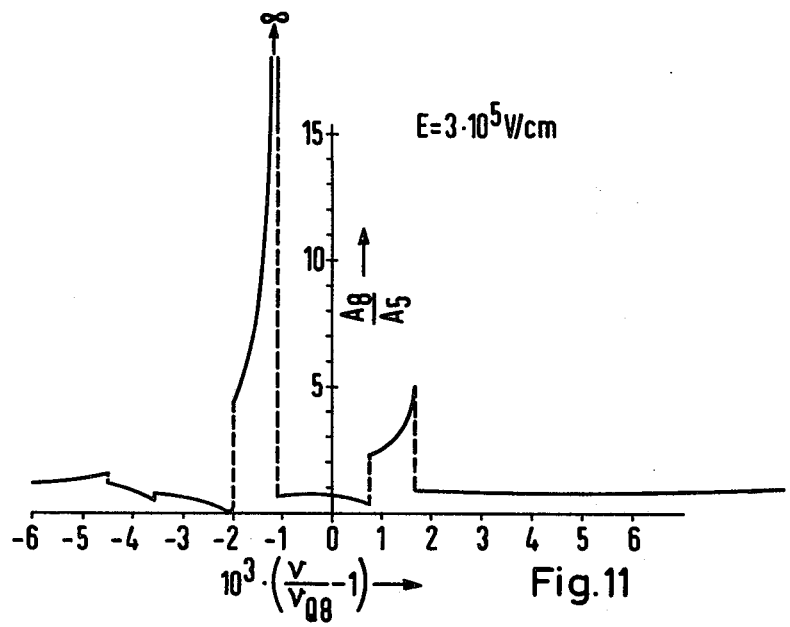
Figure 12:
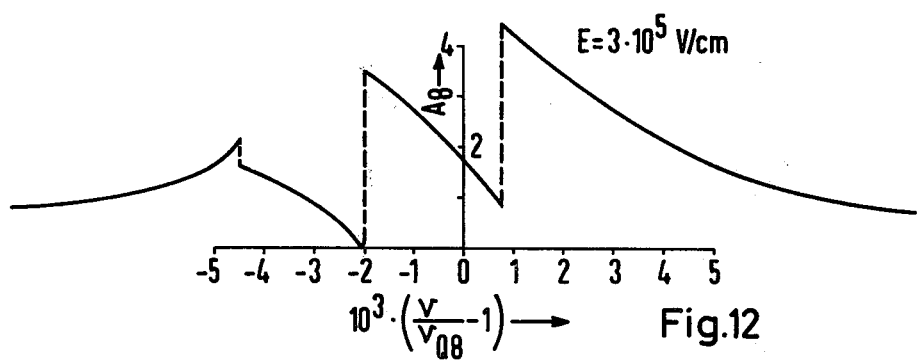
Figure 13:
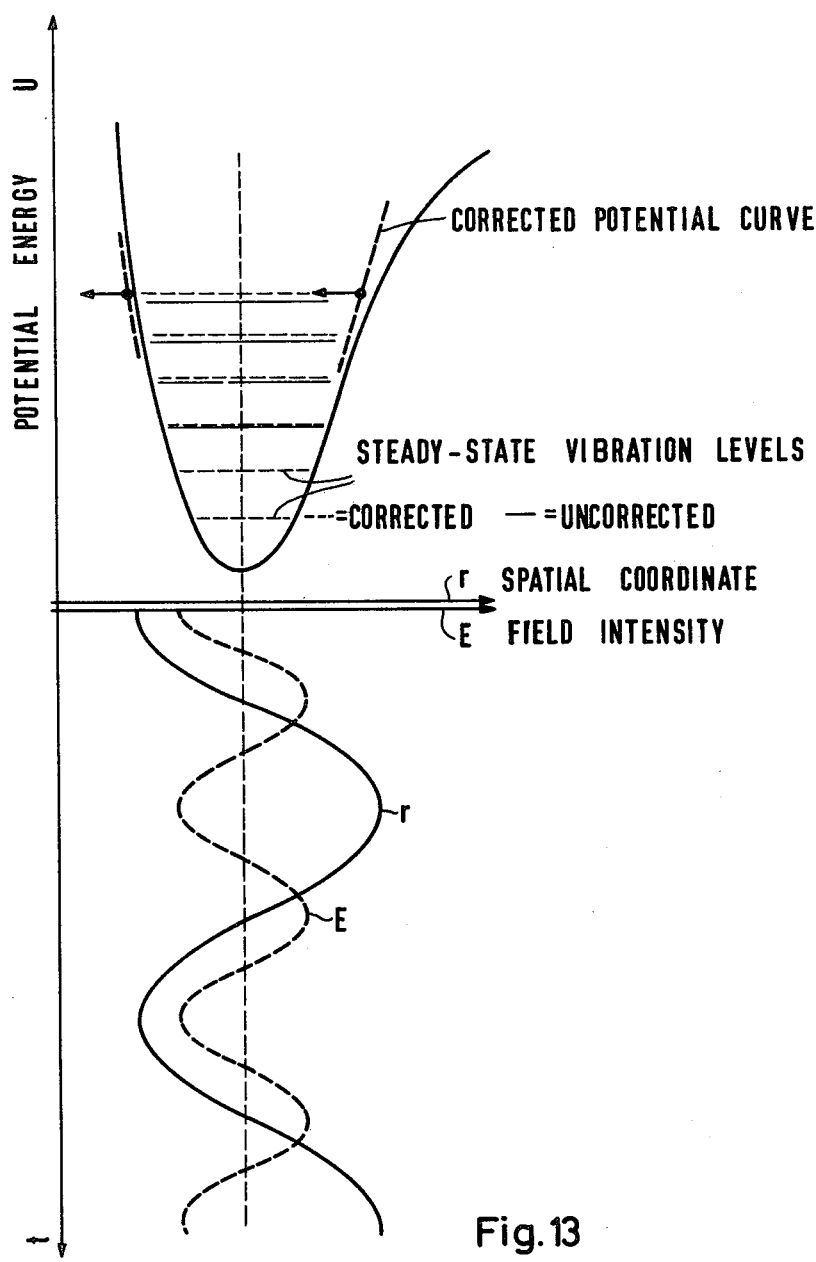

The invention, however, together with additional objects and advantages thereof will be best understood from the following description when read in connection with the accompanying drawings, in which:

FIG. 1 graphically shows the physical interrelations of the phase difference $\rho$, between the exciting alternating field of the laser radiation and the vibration of the molecule versus the exciting frequency v; and FIG. 2 graphically shows the physical interrelations of the phase difference, $\rho$, versus $(v/v_o - 1)$ in which $v_o$ is the resonance frequency; and FIG. 3 graphically shows the potential energy curves for a harmonic oscillator and an anharmonic oscillator in which potential energy U is plotted against amplitude A; and FIG. 4 graphically shows the interrelations of the amplitude of the steady-state dipole vibration versus the frequency scale $(v/v_o - 1)$ at various field strengths; and FIG. 5 graphically shows the relationship of the extinction coefficients K versus the frequency scale $(v/v_{o5} - 1)$ where v equals $v_{o5}$; and FIG. 6 graphically shows the relationship of the extinction coefficients K versus the frequency scale $(v/v_{o5} - 1)$ where v equals $0.9988\ v_{o5}$; and FIG. 7 graphically shows markedly increasing the field strength for a short time during the pulse duration; and FIG. 8 graphically shows the frequency distribution of the $UF_6$ molecules over the different rotation states P-, Q- and R branches at a rotation temperature of 20K and very low field strength versus $(v/v_{Q8} - 1)$; and FIG. 9 graphically shows the amplitude ratio $A_8/A_5$ of the 238 $UF_6$ molecules to the 235 molecules versus $(v/v_{Q8} - 1)$; and FIG. 10 graphically shows the amplitude $A_8$ of the 238 $UF_6$ molecules versus $v/v_{Q8} - 1)$; and FIG. 11 graphically shows the amplitude ratio $A_8:A_5$ for a field strength of $3 \times 10^5$ Vcm versus $(v/v_{Q8} - 1)$; and FIG. 12 graphically shows the amplitude $A_8$ for a field strength of $3 \times 10^5$ Vcm versus $(v/v_{Q8} - 1)$; and FIG. 13 graphically shows a potential curve in the vibration of a two atom molecule which has harmonics added to the resonance frequency to compensate for the anharmonicity.

Referring to FIGS. 1 and 2, in which the physical interrelations are shown graphically, it will be noted that between the exciting alternating field of the laser radiation and the vibration of the molecule (dipole moment), a phase difference is found to exist. The phase difference is plotted for the steady state in FIG. 1 versus v and in FIG. 2 versus $(v/v_o - 1)$. v is the exciting frequency and $v_o$ the resonance frequency. FIG. 1 applies for harmonic oscillator, which can be thought of as an end case of the anharmonic oscillators considered (FIG. 2) for small amplitudes.

From this, it can be seen that the phase difference between the exciting field and the dipole moment produced, or the dipole oscillation, approaches the value $-180°$ with increasing deviation from the resonance frequency $v_o$ if the frequency of the exciting field is slightly higher than the resonance frequency $v_o$. On the other hand, the phase difference approaches zero if the frequency of the exciting field v is lower than the resonance frequency; in that case, the oscillation is nearly in phase. If, however, the exciting frequency corresponds exactly to the resonance frequency, then a phase shift of the dipole vibration by 90° is obtained in the case of the harmonic oscillator.

The types of molecules to be separated according to this invention, in which the product of the oscillating electric charge and the intensity of the internal restoring field, called the restoring force, increases less than proportionally to the dipole moment, are considered as an anharmonic oscillator.

In FIG. 2, the phase shift of the steady state of such an anharmonic oscillator, in which thus the restoring force increases less than proportionally to the amplitude, is plotted also for larger amplitudes or field strengths of the exciting frequency versus the relative deviation from the resonance frequency. As the deviations of the phase shift from $\phi = 0$ and $\phi = -180°$, respectively, are so small that they lie within the thickness of a line, the region in the vicinity of $\phi = 0$ is shown enlarged in field a and the region in the vicinity of $\phi = -180°$ in field b. The scale of the abscissa applies also for the families of curves with the spread-out ordinate scale in fields a and b.

It will be seen in FIG. 2 that for small field strengths and when traversing the curves from left to right (increasing frequency), the transition from the in-phase state to the state of phase opposition takes place in a very narrow frequency range near the resonance frequency $v_o$, i.e., $(v/v_o - 1) = 0$. For higher field strengths, phase opposition takes place at lower frequencies, for instance, in the case shown in FIG. 2 at E $= 3 \times 10^5$ V/cm, at $(v/v_o - 1) = 2 \times 10^{-3}$, i.e., v = 0.998 $v_o$ (phase transition from point $a_1$ to $b_1$). The dashed curve branches belong to unstable vibration states; they are shown only to clearly indicate the frequency at which phase reversal occurs.

In accordance with the present invention, the isotope mixture to be separated is now irradiated with a coherent, polarized electromagnetic radiation, with the frequency v chosen so that at a given field strength, the dipole moment of the molecule to be excited (designated by subscripts 1) vibrates in phase opposition to the exciting field. According to FIG. 2, this occurs at a field strength of $3 \times 10^5$ V/cm if the frequency v of the exciting electric field is higher than 0.998 $v_o$, which corresponds to a value of $(v/v_o - 1) = 0.002$.

For a molecule which is not to be excited and has a higher resonance frequency $v_{o2}$, the value $(v/v_{o2} - 1)$ is s or more negative, than $(v/v_{o1} - 1)$. One can therefore achieve for small differences in the resonance frequency and the field strength, by suitable choice of the frequency and the field strength, a condition that, for instance, the molecule 1 vibrates in phase opposition to the exciting field, while molecule 2 vibrates in-phase. The effects thereof will be explained with reference to FIGS. 3, 4, 5 and 6.

FIG. 3 shows potential troughs for a symmetrical oscillation, in this case, therefore, the potential energy as a function of the dipole moment or, in the case of a constant oscillating charge, of the vibration amplitude. The dashed potential trough corresponds to harmonic oscillator, and the solid one to an anharmonic one, in which the restoring force increases less than proportionally to the excursion or outward movement, and which, for small vibration amplitudes A, almost coincides with the harmonic one. The large reduction of the oscillation frequency occurring at large amplitudes is caused by the greater widening of this potential trough as compared to the harmonic oscillator. This is the consequence of the smaller restoring force.

If now a force field which aids the restoring forces, is superimposed on the molecule's own field, a narrower potential trough is brought about and thereby, an increase of the resonance frequency. Such a force field constitutes a coherent, linearly polarized electromagnetic wave of suitable frequency and phase. If the radiated frequency is chosen so that the molecule to be excited vibrates substantially in phase opposition, then an amplification of the restoring forces occurs and thereby, an increase of the resonance frequency. Through the magnitude of the field strength of the wave, the degree of frequency correction can therefore be determined and the lowering of the resonance frequency, which occurs at high amplitudes, can be compensated, at least in part. The potential curve can thereby be approximated to the one shown for the harmonic oscillator by the dashed line in FIG. 3. If, on the other hand, the molecule oscillates in phase, an amplification of the anharmonicity effect occurs in such an anharmonic oscillator.

To explain these relations further, reference will now be made to FIGS. 4, 5 and 6. In FIG. 4, the amplitude of the steady-state dipole vibration is plotted versus the frequency scale $(v/v_o - 0 1)$. Here, $v_o$ represents the resonance frequency of the isotope to be excited, which occurs at low field strengths, and v is the radiated excitation frequency. As parameters for the curves, the indicated field strengths in V/cm were selected. Here, the branches of the curves which are drawn on the left-hand side of the curve and which become dotted, to show not-realizable sections, correspond to the in-phase state between the field strength of the exciting field and the dipole moment. Those curves of the same field strength which come from the right-hand side correspond to phase opposition; in this connection see the phase shifts in fields a and b which are shown enlarged in FIG. 2.

In FIGS. 5 and 6, the extinction coefficients K, which are calculated for only one resonance frequency according to dispersion theory, are plotted versus the relative deviation $(\nu/\nu_{o5} - 0\ 1)$ from the resonance frequency $\nu_{o5}$ valid for small field strengths. As is well known, the extinction coefficient is a measure of the energy absorption by the molecules, i.e. their excitation. Thus, if the width of the absorption bands used is smaller than the isotopy effect $\Delta \nu$, there are two different frequency regions ($\nu = \nu_{o5}$ in FIG. 5 and $\nu = 0.9988\ \nu_{o5}$ in FIG. 6) with a selectivity of excitation which is sufficient for isotope separation or enrichment. This will be explained in greater detail in the following examples.

For $UF_6$, however, the absorption bands are considerably wider at room temperature than the isotopy effect $\Delta \nu$. A sufficiently selective excitation of these molecules is therefore not possible per se. For this reason, the temperature is lowered far enough so that on the one hand, at least the Q-branches of the rotation vibration bands have become sufficiently narrow and, on the other hand, the overlap, for instance, of the Q-branch of the one isotope with the R-branch of the other isotope remains small. As the vapor pressure of the $UF_6$ at such low temperatures is too low to obtain the gas throughputs necessary for economical operation, the temperature is lowered, as already described in German Published Non-Prosecuted Patent Application P 24 47 762.1, by adiabatic expansion and the excitation radiation is radiated-in at a point of the expanding gas jet where the desired temperature is reached but no interfering condensation has yet taken place. As described in the U.S. Pat. Application Ser. No. 614,213, supplemental gases can be added for increasing the adiabatic coefficient, the relaxation speed for the vibration; as reaction partners or reactants for chemical reactions and also for reducing the resonance energy exchange. In addition, the pressure recovery described in U.S. Pat. Application Ser. No. 703,784 for reducing the cooling or pump requirements can be used.

In the following two examples, the selection of the most advantageous frequency ranges for the simplified model of the $\nu_3$-vibration of the $UF_6$, on which FIGS. 4, 5 and 6 are based, is shown. It is assumed that the radiation takes place in the Q-branch of the $\nu_3$-vibration of the molecule to be excited with a frequency band width which covers a substantial part of the Q-branch in question, which according to FIG. 8, has become very narrow due to cooling. The influence of the other resonance points will not be considered for the time being.

I. Lower Frequency Region

The isotope compound 235 $UF_6$ will first be considered. The frequency $\nu_o$, on which the presentation in FIG. 4 is based, then corresponds to the $\nu_3$-resonance frequency of the 235 $UF_6$. With a radiation frequency $\nu$ corresponding to $(\nu/\nu_o - 1) = -2.5 \times 10^{-3}$ and a field strength of $3 \times 10^5$ V/cm, an amplitude of 2.6 is obtained (point $c_1$ on FIG. 4). According to FIG. 2, the in phase state prevails here.

As the resonance frequency $\nu_o$ of the 238 $UF_6$ is about 0.1% lower, the value $(\nu/\nu_o - 1)$ is about $-1.5 \times 10^{-3}$ for the same radiated frequency. With increasing field strength, both kinds of molecules vibrate initially with a relatively small amplitude. However, when the field strength of $3 \times 10^5$ is almost reached, then the amplitude of the 238 $UF_6$ rises to higher values, while the amplitude of the 235 $UF_6$ remains still relatively small. The latter reaches here approximately the value 2.6 (point $c_1$ on FIG. 4) while that of the 238 $UF_6$ is at about 6.7 (point $c_2$ on FIG. 4). The vibration energy of these molecules is then more than 6 times as large as that of the 235 $UF_6$ molecules. This large difference in the excitation state when also makes it possible, for instance, to effect a selective chemical reaction of the more strongly excited molecule with a reaction partner and thereby, ultimately, the separation of the 238 $UF_6$-containing molecules from the original isotope mixture, when then will contain the 235 $UF_6$ molecules in enriched form. The amplitude increase of the 238 $UF_6$ described is accompanied, according to FIG. 2, by a transition into phase opposition, which prevents or counteracts the resonance frequency from travelling away with higher excitation stages and thereby makes possible the high vibration amplitudes mentioned.

In this example, the 235 $UF_6$ therefore vibrates continuously with the field strength increasing up to the value $3 \times 10^5$ substantially in-phase with the exciting field. The anharmonicity of the molecule's own internal field is amplified by the external field. On the other hand, the 238 $UF_6$ vibrates in phase only up to that field strength, the vertical curve branch of which is tangent in the negative abscissa region of FIG. 4 to the value $(\nu/\nu_o - 1)$ which corresponds to the incident radiation frequency. With increasing field strength, phase opposition to the exciting field occurs from this point on; then, the curves coming from the positive abscissa region apply. the anharmonicity of the internal field is then reduced or cancelled by the external field. This explains, as already mentioned, the higher amplitude or vibration energy of the molecule in the latter case. If, however, the field strength of the incident wave were increased further without frequency change, then, the 235 $UF_6$ also would vibrate in phase opposition to the exciting field and this would occur even with a somewhat larger amplitude than the 238 $UF_6$. These amplitude differences, however, are substantially smaller, so that selectivity is no longer available to the above-mentioned extent. This shows that it is important to choose the field strength of the exciting wave not too small but also not too large.

II. UPPER FREQUENCY REGION

This case is clearly seen at a field strength of $3 \times 10^4$ V/cm in FIG. 4. If one radiates in this example with a frequency corresponding to $(\nu/\nu_o - 1) = 0$, where $\nu_o$ represents the resonance frequency of the isotope compound 235 $UF_6$, an amplitude of 3 (point $d_1$ on FIG. 4) is obtained for the molecules of this compound. The same frequency yields a value $(\nu/\nu_o - 1) = 1 \times 10^{-3}$ with a corresponding amplitude of 0.6 (point $d_2$) for the isotope compound 238 $UF_6$. Contrary to the preceding example, the vibration energy of the 235 $UF_6$ molecules is here substantially larger than that of the 238 $UF_6$ molecules. Both kinds of molecules vibrate here substantially in phase opposition. The difference in the amplitudes or the energy in the steady-state condition is brought about here because the incident frequency is farther away from the resonance of the 238 UF$_6$ than from that of the 235 UF$_6$.

With higher field strengths and the same frequency, both kinds of molecules reach considerably higher amplitudes due to the compensation of the anharmonicity achieved by the phase opposition. The relative difference thereof becomes smaller, however.

The disadvantage appearing in both examples, namely, that the selectivity of the excitation decreases at very high field strengths, can be mitigated by special pulse-shaping as per FIG. 7. Here, the molecules are first exposed, in a continuously applied radiation or in the first part of the pulse, to a field strength, at which sufficient selectivity is still available (e.g. $3 \times 10^4$ V/cm), until the molecules have absorbed the corresponding excitation energy (e.g. $10^{-9}$ to $10^{-8}$ sec). Then the field strength is increased greatly for a short time, so that dissociation occurs in the first part of the pulse for the kind of molecule with the higher excitation. The increase of the field strength and its duration are apportioned so that mainly the molecules with the initially higher excitation energy are dissociated. For dissociating the molecules with the initially lower output energy, the time of the increased field strength (order of magnitude, about $10^{-11}$ sec) then is not sufficient to absorb enough energy. Thereby, the loss of selectivity occurring with high field strengths can be prevented, at least in part. For the full effectiveness of the measures described above to apply, no disturbance should occur before the final state is reached, as for instance, by a collision. When the final state, i.e. a large amplitude, has been reached, however, the dissociation or chemical reaction can be facilitated if a disturbance is brought about which leads at least temporarily to a reduction of the phase opposition state or even to an in-phase condition. In that case, the external field no longer aids the bond between the vibrating parts so much and even weakens it in the case of in-phase vibration. For an oscillating system with a potential trough as per FIG. 3, this means that the potential trough becomes shallower, as is shown by the dash-dotted line. The disturbance of the oscillation can be caused, for instance, by another molecule. For this purpose, the pressure may be adjusted so that the mean time between two disturbances of an excited molecule is longer than its excitation time and shorter than or equal to the dwelling time in the field of the excitation wave.

A disturbance of the stable vibration is also possible by other means such as, for example, a noticeable power change within a vibration period of the radiation or by an additional external pulse, or by a rotation which can be influenced via the rotation temperature.

From what has been said it will follow that for compensating the anharmonicity at large amplitudes, a high field strength is necessary, but for the compensation itself, no energy is removed from the field. Such field intensities can be produced by focusing in a resonator. In an ideal i.e. lossless resonator, no additional energy would have to be supplied for obtaining these high field intensities. In reality, however, resonator losses are unavoidable and should be kept as low as ever possible. In view of the high field intensities required of the exciting radiation, pulse operation is advisable.

The model used with only one resonance frequency is a special case of the classical dispersion theory. It was used to illustrate in simple terms the basic principle of influencing the anharmonicity by the external field. In general, the molecules have several resonance frequencies, the excitation of which is connected with a change of the dipole moment and which can therefore be excited by radiation. In this case, the amplitude and phase of the resultant vibration or the dipole moment of a molecule or atom are obtained from the general form of the classical dispersion theory by summing the contributions of all resonance frequencies with the correct phase. The latter is now used again to explain the selection, suitable according to the invention for selective excitation, of the excitation frequency, the field strength and the rotation temperature by the example of the UF$_6$ molecule.

The maximum of the distribution of a larger number of UF$_6$ molecules over the different rotation quantum numbers J is itself at a rotation temperature of 20 K, as can be obtained by adiabatic cooling, at about a rotation quantum number J = 15. In this quantity of gas, many groups of molecules which differ by the rotation quantum numbers J occur with a frequency given by the distribution function. The molecules of one of these groups have in a vibration transition, due to the selection rules, three transition possibilities of high probability. These correspond to a change of the rotation quantum number by $-1, 0$ and $+1$ and are designated in the absorption spectrum, as is well known, as P-, Q- and R-branches. In chemical dispersion theory, there corresponds to each of these transitions a resonance frequency of the molecule and the total amplitude of the vibration of the molecule is obtained, according to the dispersion theory, by summation of the absolute values of the different resonance frequencies with the correct phase, taking into consideration the strength of the oscillators.

Resonance frequencies which are very different from the incident radiation frequency or such with much lower oscillator strength (smaller transition probability) have only little influence and can therefore be ignored in the summation.

Since the amplitude contributions of the resonance frequencies are nearly of the same or opposite phase in the frequency ranges of interest, as is shown in FIG. 2, one can achieve, through a suitable choice of frequency, nearly compensation of the amplitude contributions of the different resonance points for one kind of molecule, while at the same frequency, a molecule of the other isotope has a relatively large amplitude. High selectivity of the excitation is thus achieved thereby.

By way of the example of the $v_3$-vibration of UF$_6$, it will be shown by means of FIGS. 8, 9 and 10 how to suitably select the excitation frequency and the gas temperature at the point of irradiation. The curves show the feature of the invention.

In FIG. 8, the frequency distribution of the UF$_6$ molecules over the different rotation states is plotted at a rotation temperature of 20 K and a very low field strength (less than 1 V/cm) versus ($v/v_Q 8 - 1$) for the P-, Q- and R-branch of the $v_3$-vibration of the 238 UF$_6$ and 235 UF$_6$. It is furthermore assumed that the transition probabilities in the three branches are not very much different. For the group of molecules which are situated at the maximum of the distribution curves in FIG. 8, i.e. those with the rotation quantum of, say, = 15, FIG. 9 shows the amplitude ratio $A_8/A_5$ of the 238 UF$_6$ molecules to the 235 UF$_6$ molecules, and FIG. 10 the amplitude $A_8$ of the 238 UF$_6$ molecules, respectively, on an arbitrary scale, in the steady state and for a field strength of $3 \times 10^4$ V/cm.

If the excitation is performed, for instance, with a radiation of frequency v corresponding to $(v/v_{Q8} - 1) = -0.3 \times 10^{-3}$ with a band width which corresponds to the band width of this group in the Q-branch, one reads from FIGS. 9 and 10, for a field strength of $3 \times 10^4$ V/cm, approximately the values $A_8/A_5 = 26$ and $A_8 = 1.3$. Thus, FIG. 9 shows that with this choice of the incident radiation frequency and its band width, the 238 $UF_6$ molecules to be separated have a 26-times larger amplitude than equivalent molecules (such with = 15) of the kind that is not to be separated. If one therefore selects, in the case of separation by chemical reaction, a reaction partner, for which an activation energy equal to or slightly smaller than the excitation energy of the 238 $UF_6$ but larger than the excitation energy of the 235 $UF_6$ is required, a high selectivity for the separation is obtained.

Large amplitude ratios and amplitudes are also obtained at $(v/v_{Q8} - 1) = 2.5 \times 10^{-3}$ and $-2.9 \times 10^{-3}$, but the incident radiated frequency band covers directly only relatively few molecules, see FIG. 8, i.e. without transfer of further molecules into this frequency range, for example, by collisions.

Analogously, one can plot the curves for $A_5/A_8$ and $A_5$ for determining the most advantageous frequencies for the separation of the 235 $UF_6$. Thus, high selectivity is obtained, on the one hand, due to the fact that, while avoiding many collisions in the region of the radiation, the number of the molecules with the same resonance frequency is greatly different for the two isotopes, and on the other hand, due to the fact that concentration areas of molecules of the isotope with undesired excitation, e.g. Q-branch, vibrate in-phase and/or their resonance frequency is farther away from the excitation frequency of the kind of molecules which is not to be excited.

With increasing field strength, the advantageous radiation frequencies become lower. In FIGS. 11 and 12, the amplitude ratio $A_8:A_5$ and the amplitude $A_8$ are plotted for a field strength of $3 \times 10^5$ V/cm. From this, it is concluded that a frequency corresponding to $(v/v_{Q8} - 1) = -1.3 \times 10^{-3}$ is favorable.

As a comparison with FIGS. 9 and 10 shows, this frequency is not suited for a field strength of $3 \times 10^4$ V/cm. The amplitude ratio $A_8:A_5$ and the amplitude $A_8$ are very small and, contrary to the higher field strength, the 235 $UF_6$ is even excited somewhat more. The reason for the fact that the amplitude $A_8$ is small at this frequency for the field strength of $3 \times 10^5$ V/cm is that in this case the dipole moment of the 238 $UF_6$ vibrates in-phase. If therefore, the frequency which is chosen as favorable for high field strengths is held constant, then the undesired excitation sets in only when a sufficiently high field strength is reached. A frequency which is favorable for the selective excitation is therefore defined here only in conjunction with the associated field strength. This disadvantage, which occurs at high field strengths, can be avoided by additionally readjusting the frequency in accordance with the invention in such a manner that at the field strength reached, the optimum conditions described, namely a large amplitude ratio and a large amplitude, prevail at the location of the molecule under consideration for the kind of molecules to be selectively excited during the main portion of the excitation time.

In the example mentioned, the frequency must therefore correspond, at the field strength $3 \times 10^4$ V/cm, to the value $(v/v_{Q8} - 1) = -0.3 \times 10^{-3}$ and at the field strength $3 \times 10^5$ V/cm, to the value $(v/v_{Q8} - 1) = -1.3 \times 10^{-3}$, if 238 $UF_6$ is to be excited.

Several methods are known for changing the frequency of the laser radiation, which can be used for the follow-up readjustment. If the radiation is generated, for instance, by frequency mixing in a crystal, then the frequency changes if the lattice spacings are changed. Such a change can be achieved by local heating due to controlled absorbed radiation or by pressure changes, e.g. by piezoelectric quartz.

The considerations carried out for the group of molecules with the rotation quantum number = 15 are analogously valid also for the other groups of molecules with other values. From an overallview of the conditions determined for the different groups of molecules, one obtains for engaging the main part of the molecules to be excited, at a rotation temperature of 20 K and a field strength of $3 \times 10^4$ V/cm, for instance, a mean excitation frequency corresponding to $(v/v_{Q8} - 1) = -0.16 \times 10^{-3}$, with a band width corresponding to $\Delta v/v_{Q8} = 0.48 \times 10^{-3}$ ($v = 0.9 \times 10^{10}$ sec$^{-1}$).

For these values, it will be seen from FIG. 8, that due to the heavy or considerable narrowing-down of the Q-branch because of the cooling, almost the entire Q-branch and therefore, nearly all the molecules of the 238 $UF_6$ are engaged by the radiation, while only a very small part of the 235 $UF_6$ (mainly from the P-branch) lies in the frequency range of the radiation.

This leads to high selectivity of the excitation. It should be noted here, however, that the number of collisions per molecule in the excited state should not be so large that the gaps in the distribution curve, created by the separation, of the not-to-be-excited molecules are refilled by collisions so often, that finally a large part of these molecules also are separated.

Besides or instead of the concentration points of resonance frequencies in the Q-branch thus far discussed, concentrations can occur also in other branches, e.g. at edges of the R- or P-branch. The method is applicable also at these locations. The temperatures (rotation temperature and vibration temperature) at the point of the irradiation must then again be adjusted so that the concentration is as pronounced as possible and the overlap of the band isotopes is small in the frequency range of the radiation.

If only one excitation frequency is radiated, compensation can be achieved, for instance, for the time average over one period in the case of phase opposition. This is not possible for every time interval within a period in general, i.e. for any arbitrary internal field of the molecules. This becomes particularly clear in the case of an asymmetrical vibration. The associated potential trough is then also asymmetrical, as schematically shown in FIG. 13.

Such a potential trough is present, for instance, in the vibration of a two-atom molecule. In that case, a compensation of the anharmonicity effects can be achieved by admixing harmonics to the resonance frequency, as may also be seen from FIG. 13. The wave from of the electric field of this frequency (solid curve) as well as of the first harmonic (broken curve) are shown underneath the potential trough. From this, it can be seen that the electric field of an harmonic acts as a restoring force; see the points with the arrow in the upper part of FIG. 5. This "correction radiation" can be obtained in a simple manner by introducing optically nonlinear media into the ray path of the laser radiation. Another procedure is the use of "external admixture" of the harmonic, i.e. generating the same, for example in a separate laser system.

Ths correction of the potential curve to approximate an harmonic oscillation can be improved in principle by admixing further harmonics, i.e. the process medium or the isotope mixture, should be irradiated with a fundamental frequency and its harmonics, where the fundamental frequency is adjusted selectively to the isotope or isotope compound to be separated.

The method can also be applied to electron transitions or to such with rotation vibration transitions. Then the frequency of the excitation radiation is at substantially higher values, e.g. in the visible or ultra-violet range.

If excitation is achieved selectively by the described method, an even stronger excitation can be achieved also by an additional electromagnetic radiation of different frequency.

There are claimed:

1. In a method for the separation or enrichment of isotopes in a vaporous mixture of molecules containing the isotopes to selectively excite the group of molecules containing one isotope by means of coherent, polarized electromagnetic radiation, the improvement comprising applying said radiation to said vaporous mixture of molecules, with a frequency and field strength such that the dipole moment of the group of molecules to be excited vibrates, at least at the final amplitude, mainly in phase opposition relative to the exciting field of applied radiation, and the group of molecules containing the other isotope in said vaporous mixture of molecules vibrates mainly in-phase relative to the exciting field of applied radiation.

2. Method according to claim 1, wherein in addition to applying the coherent radiation to the vaporous isotope mixture with the frequency adjusted such that the dipoles of the molecules of the isotope which is to be excited selectively vibrate mainly in phase opposition to the exciting field of the radiation, there is radiated a force field with a harmonic oscillation frequency to prevent a shift of the resonance of the dipoles.

3. Method according to claim 1, wherein after the maximum vibration amplitude is reached, a disturbance of this state is brought about to facilitate a dissociation or chemical reaction of the excited molecules.

4. Method according to claim 3, wherein said disturbance of the maximum vibration state reached is achieved by molecular collisions 5. Method according to claim 4, wherein said disturbance of the maximum vibration state reached is obtained by changing the pressure on the molecules.

6. Method according to claim 3, wherein said disturbance of the maximum vibration state reached is obtained by changing the power of the radiation applied to the molecules within a vibration period.

7. Method according to claim 3, wherein said disturbance of the maximum vibration state reached is obtained by applying a supplemental pulse.

8. Method according to claim 1, wherein said mixture of molecules is expanded adiabatically before the mixture enters into a zone where said coherent radiation is applied to effect narrowing down the spectrum of molecules with a broad absorption spectrum.

9. Method according to claim 8, wherein a gas with a large adiabatic coefficient is admixed with said mixture of compounds before expanding adiabatically.

10. Method according to claim 1, including a brief increase of the field strength to achieve higher states of excitation, its duration being apportioned so that mainly the selectively more strongly excited groups of molecules are dissociated or reacted.

11. Method according to claim 1, including a follow-up frequency readjustment matched to the respective field strength for adjusting optimum amplitudes and amplitude ratios of the isotope mixture.

12. Method according to claim 1, including applying, after the selective excitation, an additional radiation, to obtain higher excitation states, which additional radiation by itself need not have selective action.

13. In a method for the separation or enrichment of isotopes in a vaporous mixture of molecules containing the isotopes to selectively excite the group of molecules containing one isotope by means of coherent, polarized electromagnetic radiation, the improvement comprising applying to said vaporous mixture of molecules a radiation with a frequency which is closer to the resonance frequency of the group of molecules to be separated than of the other group of molecules containing the other isotope in said vaporous mixture of molecules and is in the order of magnitude of the isotope-determined frequency difference and both kinds of molecules in said vaporous mixture of molecules vibrate in phase opposition relative to the field of applied radiation.

14. Method according to claim 13, wherein after the maximum vibration amplitude is reached, a disturbance of this state is brought about to facilitate a dissociation or chemical reaction of the excited molecules.

15. Method according to claim 14, wherein said disturbance of the maximum vibration state reached is achieved by molecular collisions.

16. Method according to claim 15, wherein said disturbance of the maximum vibration state reached is obtained by changing the pressure on the molecules.

17. Method according to claim 14, wherein said disturbance of the maximum vibration state reached is obtained by changing the power of the radiation applied to the molecules within a vibration period.

18. Method according to claim 14, wherein said disturbance of the maximum vibration state reached is obtained by applying a supplemental pulse.

19. Method according to claim 13, wherein said mixture of molecules is expanded adiabatically before the mixture enters into a zone where said coherent radiation is applied to effect narrowing down the spectrum of molecules with a broad absorption spectrum.

20. Method according to claim 19, wherein a gas with a large adiabatic coefficient is admixed with said mixture of compounds before expanding adiabatically.

21. Method according to claim 1, wherein pressure recovery in the reaction is utilized for increasing efficiency.

22. Method according to claim 13, wherein pressure recovery in the reaction is utilized for increasing efficiency.

23. Method according to claim 13, including a brief increase of the field strength to achieve higher states of excitation, its duration being apportioned so that mainly the selectively more strongly excited groups of molecules are dissociated or reacted.

24. Method according to claim 13, including a follow-up frequency readjustment matched to the respective field strength for adjusting optimum amlitudes and amplitude ratios of the isotope mixture.

25. Method according to claim 13, including applying, after the selective excitation, an additional radiation, to obtain higher excitation states, which additional radiation by itself need not have selective action.

* * * * *